(No Model.)
2 Sheets—Sheet 1.

R. H. BULLOCH.
MECHANICAL BOARD MEASURE CALCULATOR.

No. 324,078. Patented Aug. 11, 1885.

WITNESSES
INVENTOR:
Robert H. Bulloch
by Wm. H. Finckel
Attorney (No Model.) 2 Sheets—Sheet 2.
R. H. BULLOCH.
MECHANICAL BOARD MEASURE CALCULATOR.
No. 324,078. Patented Aug. 11, 1885.

WITNESSES
INVENTOR:
Robert H. Bulloch
Attorney

UNITED STATES PATENT OFFICE.

ROBERT H. BULLOCH, OF SAVANNAH, GEORGIA, ASSIGNOR OF ONE-HALF TO FRANK C. GARMANY, OF SAME PLACE.

MECHANICAL BOARD-MEASURE CALCULATOR.

SPECIFICATION forming part of Letters Patent No. 324,078, dated August 11, 1885.

Application filed December 11, 1884. (No model.)

*To all whom it may concern:*

Be it known that I, ROBERT H. BULLOCH, a citizen of the United States, residing at Savannah, in the county of Chatham and State of Georgia, have invented a certain new and useful Mechanical Board-Measure Calculator, of which the following is a full, clear, and exact description.

The object of this invention is to provide a mechanical device for ascertaining very readily the contents of a piece of board the length, breadth, and thickness of which are known.

The device is an improved form of old mechanical calculators, specially applicable to the object above stated.

The invention consists in two scales fixed at a right angle, combined with a third scale movable with relation to one of the other scales, and a pointer or index movable over one of the fixed scales, and also over the movable scale, to ascertain a desired result, as I will now proceed to specify, and particularly point out in the claim at the end of this specification.

Figure 1:
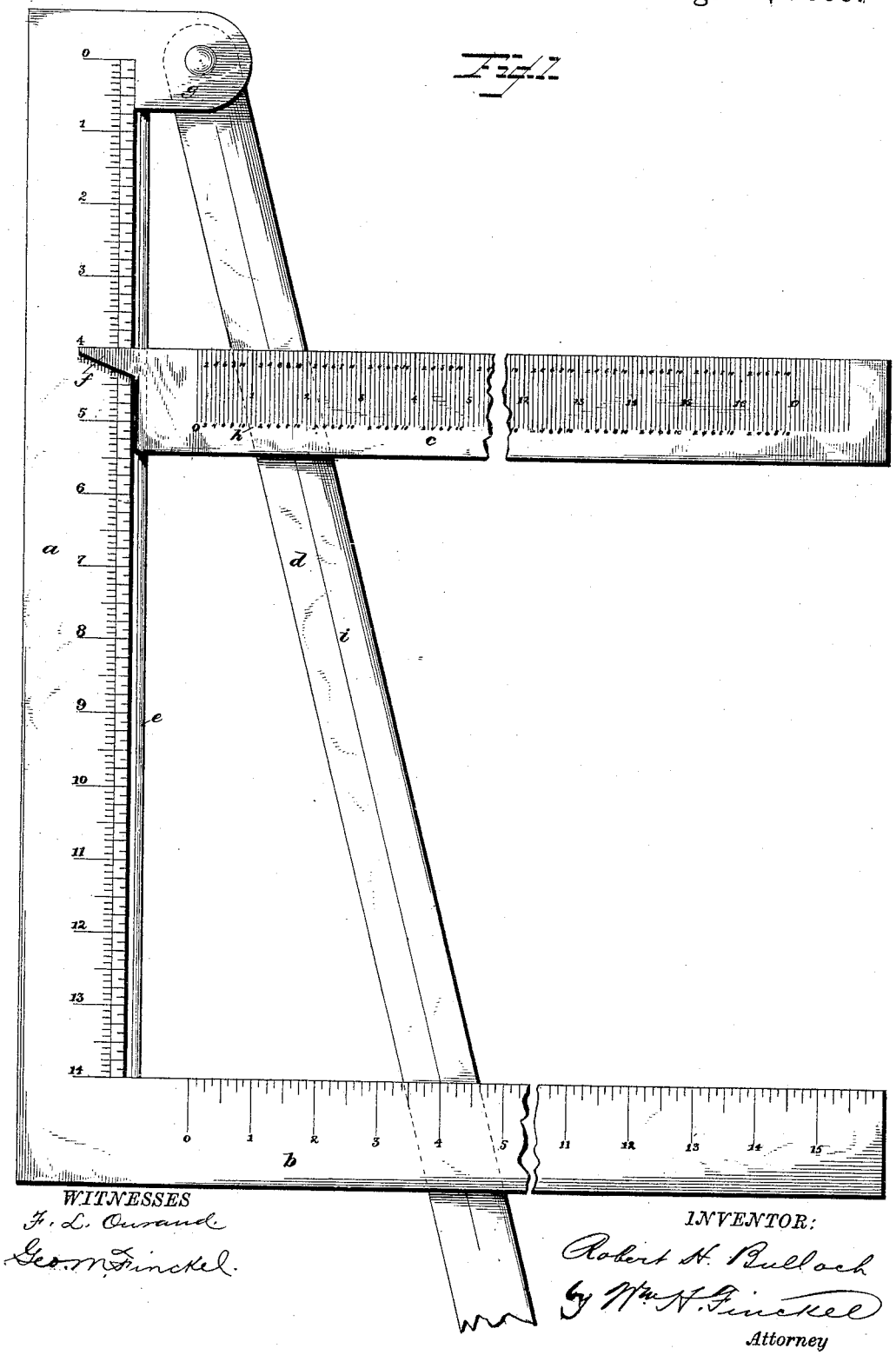
Figure 2:
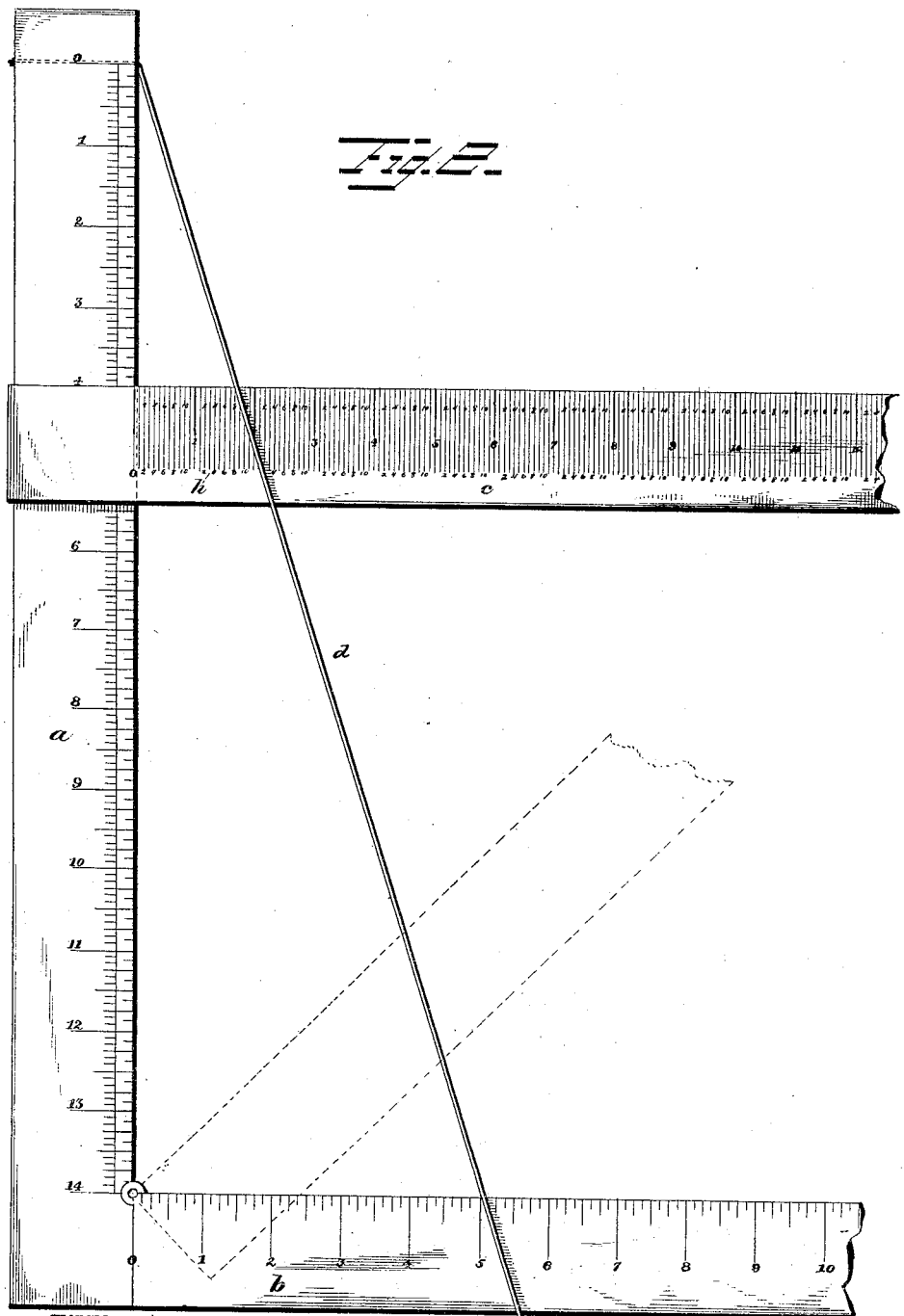

In the accompanying drawings, in the two figures of which like parts are similarly designated, Figure 1 is a plan view of the calculator, and Fig. 2 a similar view of a slightly-modified form of construction, both being broken.

The mechanical parts of the device comprise an arm, $a$, a second arm, $b$, fixed at right angles thereto, a third arm, $c$, so connected at right angles with arm $a$ as to be movable longitudinally thereof, and a fourth arm, $d$, pivoted or jointed to the arm $a$, and long enough to intersect the arms $b$ and $c$. The arm $c$ is, as shown in Fig. 1, connected to arm $a$ by means of a rod, $e$, which it encircles, or to which it is otherwise attached, so as to be movable lengthwise of said rod and arm, and the said arm $c$ has a pointer-finger, $f$, overlying the arm $a$. Instead of having the arm $c$ thus movably connected to arm $a$, I may make a loop in its end to encircle the said arm $a$, as shown in Fig. 2, and in this form the pointer-finger $f$ will be unnecessary. The scale $c$ must be arranged to move at right angles with the arm $a$ and parallel with arm $b$.

The pointer or index $d$ may be a rigid arm pivoted to a projection, $g$, of the arm $a$, (see Fig. 1;) or it may be a cord or wire (see Fig. 2) secured to the arm $a$. The rod $e$ may be conveniently secured to arm $b$ and projection $g$.

The relation of the arms $a$ and $b$ is fixed, and their juncture may be either rigid, as in Fig. 1, or movable, as in Fig. 2, in which latter case a rule-joint will be effective to admit of the folding together of the device when not in use.

The parts of the device may be of wood, metal, rubber, or other suitable substance or material.

The several arms $a\ b\ c$ are graduated or provided with scales, which bear a fixed relation to each other after the unit is once fixed, and in order that accurate results may be obtained in the use of the scales it is essential that the pointer or index should turn on a point in line with the zero-points of the scales; or, conversely, the zeros of the scales must be coincident with the pivot of the index.

The unit of measurement having been adopted, the scale on arm $a$ is laid off in whole numbers, eighths, and twelfths, the scale on arm $b$ in whole numbers and eighths and the scale on arm $c$ in whole numbers and twelfths, and, besides the enumeration of the twelfths as such, an additional enumeration is given them at $h$, which expresses totals of twelfths, and will be hereinafter referred to as "result-scale $h$."

The graduations of arms $a$ and $c$ determine the graduation of arm $b$ as to length of divisions. Thus the spaces between units on arm $b$ are in length equal to as many subdivisions of the scale $c$ as are indicated by the whole number of units on the scale on arm $a$, which may be read from the passage of the arm $c$ along it. In the example shown in Fig. 1 the arm $a$ has fourteen divisions or units, each of which is subdivided into eighths and twelfths. Now, the units and subdivisions thereof of the scale of arm $c$ may be purely arbitrary as to length, but are preferably small, so as to bring the calculator within as small compass as possible; but whatever these units or subdivisions thereof are, the units of the scale of arm $b$ must be equal in number to the number of subdivisions on scale on arm $c$, corresponding with the number of units on scale on arm $a$, which in this instance is fourteen. From these facts and the zero arrangement of index $d$ it follows that the location of the arm $c$ at a given point on the scale of arm $a$, and the intersection of the index $d$ with the arm $b$, will give a fixed proportional location of the index on the arm $c$, and will enable the reading of a thereby fixed fact from the scale of said arm $c$. To illustrate: Suppose it is desired to find the board-measure of a piece of lumber four inches wide by four inches thick by twelve feet long, the arm $c$ is moved to the unit 4 on scale $a$ for the thickness, and the index $d$ is moved to the unit 4 on scale $b$ for the width. The reading-point of the index, if it be other than a fine cord or wire, will be a line drawn through its length centrally of its pivot, (see line $i$,) and in this example said line intersects the scale on arm $c$ at the point marked $1\frac{4}{12}$, from which it is learned that in cross-section the piece of timber is one foot and four inches, to which must be added the unit of lumber-measure—namely, one inch in thickness—so that the reading would be $1\frac{4}{12} \times \frac{1}{12}$. Now, this result determines the next operation, for it ascertains the number of board or lumber measure feet there are in the cross-section of the piece of timber. The arm $c$ is then moved on arm $a$ to the point $1\frac{4}{12}$, and the index is moved to the unit of length of board on scale $b$, which in this example is 12. Now, by referring to arm $c$ it will be found that the index intersects its scale at the point $1\frac{4}{12}$, and if that line be followed down to the scale $h$ it will indicate 16, which will be the number of board feet in the board. This last result is omitted from the drawing in order that the view may be as large as possible.

By this means the contents of a board are readily and accurately ascertained without figuring and the mistakes incident to such mental operations, and the value of this calculator in cases where there are fractions is specially great.

What I claim is—

In a board-measure calculator, the two fixed graduated arms at right angles one to the other, and a third graduated arm at right angles to one and parallel with the other and movable in parallel planes with relation to the latter, the said latter arm having its units of measurement equal in length to a number of subdivisions of the movable arm corresponding with the number of units on the arm to which the movable arm is connected, combined with an index or pointer intersecting the movable arm and the arm to which it is parallel, substantially as and for the purpose described.

In testimony whereof I have hereunto set my hand this 8th day of December, A. D. 1884.

ROBT. H. BULLOCH.

Witnesses:
R. D. WALKER, Jr.,
J. R. SAUSSY, Jr.